(12) United States Patent
Takahashi et al.

(10) Patent No.: US 11,895,523 B2
(45) Date of Patent: Feb. 6, 2024

(54) USER APPARATUS

(71) Applicant: NTT DOCOMO, INC., Tokyo (JP)

(72) Inventors: Hideaki Takahashi, Tokyo (JP); Tianyang Min, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 336 days.

(21) Appl. No.: 17/427,813

(22) PCT Filed: Feb. 8, 2019

(86) PCT No.: PCT/JP2019/004699
§ 371 (c)(1),
(2) Date: Aug. 2, 2021

(87) PCT Pub. No.: WO2020/161907
PCT Pub. Date: Aug. 13, 2020

(65) Prior Publication Data
US 2022/0141691 A1  May 5, 2022

(51) Int. Cl.
*H04W 24/10* (2009.01)
*H04W 76/15* (2018.01)
(Continued)

(52) U.S. Cl.
CPC .......... *H04W 24/10* (2013.01); *H04L 1/1642* (2013.01); *H04W 56/001* (2013.01); *H04W 76/15* (2018.02)

(58) Field of Classification Search
CPC .............. H04L 1/1642; H04W 76/15; H04W 56/0015; H04W 56/001; H04W 24/10
See application file for complete search history.

(56) References Cited

U.S. PATENT DOCUMENTS 11,102,693 B1 * 8/2021 Fang .................. H04L 43/0864
2017/0134976 A1   5/2017 Uchino et al.
(Continued)

FOREIGN PATENT DOCUMENTS

WO       2015194570 A1    12/2015

OTHER PUBLICATIONS

International Search Report for corresponding International Application No. PCT/JP2019/004699, dated Mar. 19, 2019 (5 pages).
(Continued)

*Primary Examiner* — Syed Ali
(74) *Attorney, Agent, or Firm* — Osha Bergman Watanabe & Burton LLP

(57) ABSTRACT

A user apparatus includes a communication unit configured to communicate with a first base station apparatus and a second base station apparatus, wherein the first base station apparatus is a master node in a New Radio (NR) radio communication system and the second base station apparatus is a secondary node in the NR radio communication system; a reception unit configured to receive from the first base station apparatus an instruction to measure a system frame number and frame timing difference (SFTD) representing a system frame number and frame timing difference between cells; a control unit configured to measure SFTD between a cell of the first base station apparatus and a cell of the second base station apparatus based on the instruction to measure SFTD; and a transmission unit configured to transmit to the first base station apparatus a measurement result including the measured SFTD.

5 Claims, 21 Drawing Sheets

(51) Int. Cl.
*H04L 1/1607* (2023.01)
*H04W 56/00* (2009.01)

(56) References Cited

U.S. PATENT DOCUMENTS

| | | | |
|---|---|---|---|
| 2017/0150475 A1* | 5/2017 | Li | H04W 76/23 |
| 2017/0318417 A1* | 11/2017 | Kusumoto | H04W 4/021 |
| 2019/0230477 A1* | 7/2019 | Yu | G01S 5/0236 |
| 2020/0187064 A1* | 6/2020 | Susitaival | H04W 36/08 |
| 2021/0058996 A1* | 2/2021 | Yang | H04W 56/001 |
| 2021/0119881 A1* | 4/2021 | Shirazipour | H04L 41/0823 |

OTHER PUBLICATIONS

Written Opinion for corresponding International Application No. PCT/JP2019/004699, dated Mar. 19, 2019 (6 pages).
3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).
3GPP TS 37.340 V15.4.0; "3rd Generation Partnership Project; Technical Specification Group Radio Access Network; Evolved Universal Terrestrial Radio Access (E-UTRA) and NR; Multi-connectivity; Stage 2 (Release 15)"; Dec. 2018 (67 pages).
3GPP TS 38.215 V15.4.0; "3rd Generation Partnership Project; Technical Specification Group Radio Access Network; NR; Physical layer measurements (Release 15)"; Dec. 2018 (15 pages).
H. Huawei; "Discussion on SFTD measurements for late drop"; 3GPP TSG-RAN WG2#104, R2-1817992; Spokane, US; Nov. 12-16, 2018 (3 pages).
RAN WG4; "LS on SFTD scenarios for late drop"; 3GPP TSG RAN WG2#103bis, R2-1813536; Chengdu, China; Oct. 8-12, 2018 (2 pages).
Ericsson; "On SFTD measurement report configuration and TP for 38.331"; 3GPP TSG-RAN WG2#101bis, R2-1805854; Sanya, China; Apr. 16-20, 2018 (12 pages).
Office Action issued in Chinese Patent Application No. 201980091125.0, dated Sep. 5, 2023 (20 pages).

* cited by examiner

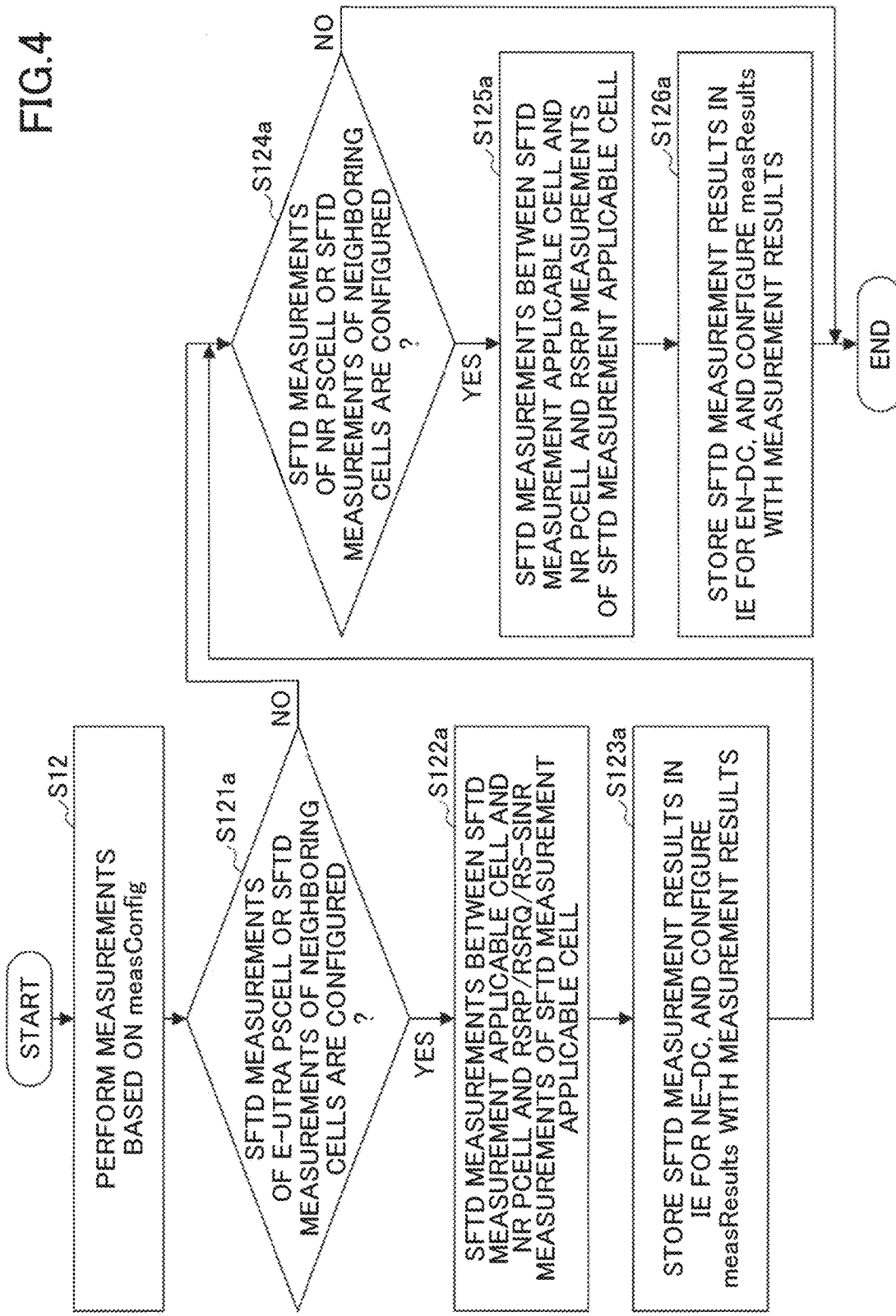

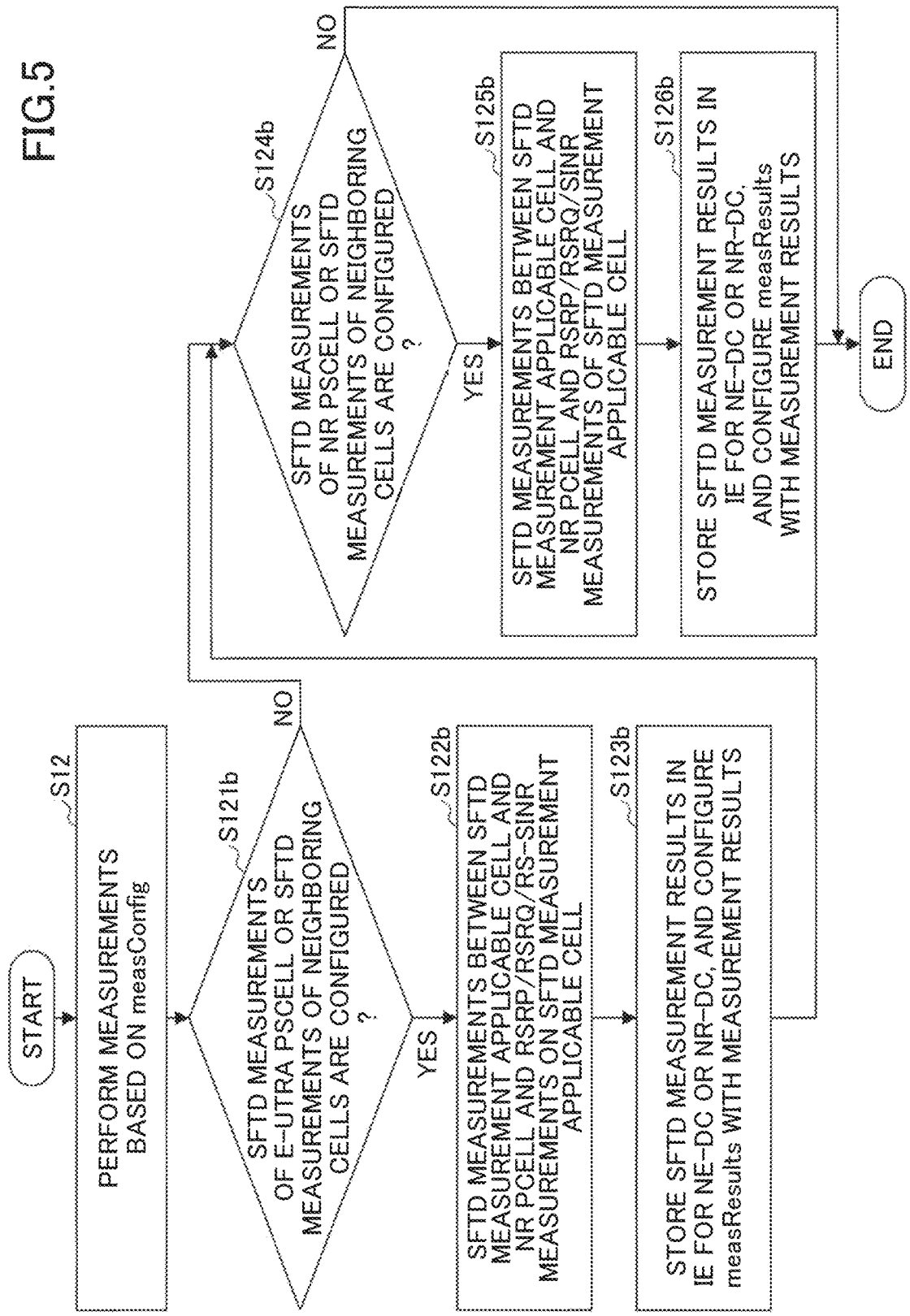

FIG.6

5.1.14  SFN and frame timing difference (SFTD)

| Definition | The observed SFN and frame timing difference (SFTD) between a PCell and a PSCell is defined for MR-DC as comprising the following two components:<br><br>- SFN offset = $(SFN_{PCell} - SFN_{PSCell})$ mod 1024, where;<br><br>   - For EN-DC, $SFN_{PCell}$ is the SFN of an E-UTRA PCell radio frame and $SFN_{PSCell}$ is the SFN of the NR PSCell radio frame of which the UE receives the start closest in time to the time when it receives the start of the PCell radio frame.<br><br>   - For NE-DC, $SFN_{PCell}$ is the SFN of an NR PCell radio frame and $SFN_{PSCell}$ is the SFN of an E-UTRA PSCell radio frame of which the UE receives the start closest in time to the time when it receives the start of the PCell radio frame.<br><br>   - For NR-DC, $SFN_{PCell}$ is the SFN of an NR PCell radio frame and $SFN_{PSCell}$ is the SFN of an NR PSCell radio frame of which the UE receives the start closest in time to the time when it receives the start of the PCell radio frame.<br><br>- Frame boundary offset = $\lfloor (T_{FrameBoundaryPCell} - T_{FrameBoundaryPSCell})/5 \rfloor$ , where $T_{FrameBoundaryPCell}$ is the time when the UE receives the start of a radio frame from the PCell, $T_{FrameBoundaryPSCell}$ is the time when the UE receives the start of the radio frame, from the PSCell, that is closest in time to the radio frame received from the PCell. The unit of $(T_{FrameBoundaryPCell} - T_{FrameBoundaryPSCell})$ is Ts. |
|---|---|
| Applicable for | RRC_CONNECTED intra-frequency |

FIG.7

5.5.2 Measurement configuration

5.5.2.1 General

The network applies the procedure as follows:

[...]

- to configure at most one measurement identity using a reporting configuration with *reportSFTD-MeasNEDC*.
- to configure at most one measurement identity using a reporting configuration with *reportSFTD-MeasNRDC*.

FIG.8

5.5.2.5 Measurement object addition/modification

The UE shall:
1> for each *measObjectId* included in the received *measObjectToAddModList*:
  2> if an entry with the matching *measObjectId* exists in the *measObjectList* within the *VarMeasConfig*, for this entry:
    [...]
    3> if the received *measObject* modifies fields other than *cellsForWhichToReportSFTD-NEDC*; or
    3> if the received *measObject* modifies fields other than *cellsForWhichToReportSFTD-NRDC*:
      4> for each *measId* associated with this *measObjectId* in the *measIdList* within the *VarMeasConfig*, if any:
        5> remove the measurement reporting entry for this *measId* from the *VarMeasReportList*, if included;
        5> stop the periodical reporting timer or timer T321, whichever one is running, and reset the associated information (e.g. *timeToTrigger*) for this *measId*;
  2> else:
    3> add a new entry for the received *measObject* to the *measObjectList* within *VarMeasConfig*.

FIG.9

5.5.3 Performing measurements

5.5.3.1 General

The UE shall:
1> for each *measId* included in the *measIdList* within *VarMeasConfig*:
  2> if the *reportType* for the associated *reportConfig* is *periodical* or *eventTriggered*:
    3> if a measurement gap configuration is setup, or
    3> if the UE does not require measurement gaps to perform the concerned measurements:
      4> if the *reportSFTD-MeasNEDC* is set to *pSCell* in the associated *reportConfigInterRAT*:
        5> perform SFTD measurements between the (NR) PCell and the E-UTRA PSCell;
      4> if the *reportSFTD-MeasNEDC* is set to *neighborCells* in the associated *reportConfigInterRAT*:
        5> perform SFTD measurements between the (NR) PCell and E-UTRA cell(s) on the frequency indicated in the associated *measObjectEUTRA*;
      4> if the *reportSFTD-MeasNRDC* is set to *pSCell* in the associated *reportConfigNR*:
        5> perform SFTD measurements between the (NR) PCell and the (NR) PSCell;
      4> if the *reportSFTD-MeasNRDC* is set to *neighborCells* in the associated *reportConfigNR*:
        5> perform SFTD measurements between the (NR) PCell and NR cell(s) on the frequency indicated in the associated *measObjectNR*;
  2> perform the evaluation of reporting criteria as specified in 5.5.4.

FIG. 10

5.5.4 Measurement report triggering

5.5.4.1 General

If security has been activated successfully, the UE shall:

1> for each *measId* included in the *measIdList* within *VarMeasConfig*:

2> if the corresponding *reportConfig* includes a *reportType* set to *eventTriggered* or *periodical*;

3> if the corresponding *measObject* concerns NR;

4> if the *reportSFTD-MeasNRDC* is set to *pSCell* in the corresponding *reportConfigNR*:

5> consider the PSCell in NR to be applicable;

4> else if the *reportSFTD-MeasNRDC* is set to *neighborCells* in the corresponding *reportConfigNR*:

5> if *cellsForWhichToReportSFTD-NRDC* is configured in the corresponding *measObjectNR*:

6> consider any neighbouring NR cells on the associated frequency that is included in *cellsForWhichToReportSFTD-NRDC* to be applicable;

5> else:

6> consider up to 3 strongest neighbouring NR cells detected on the associated frequency to be applicable when the concerned cells are not included in the *blackCellsToAddModList* defined within the *VarMeasConfig* for this *measId*;

3> else if the corresponding *measObject* concerns E-UTRA;

4> if the *reportSFTD-MeasNEDC* is set to *pSCell* in the corresponding *reportConfigInterRAT*:

5> consider the PSCell in E-UTRA to be applicable;

4> else if the *reportSFTD-MeasNEDC* is set to *neighborCells* in the corresponding *reportConfigInterRAT*:

5> if *cellsForWhichToReportSFTD-NEDC* is configured in the corresponding *measObjectEUTRA*:

6> consider any neighbouring E-UTRA cells on the associated frequency that is included in *cellsForWhichToReportSFTD-NEDC* to be applicable;

5> else:

6> consider up to 3 strongest neighbouring E-UTRA cells detected on the associated frequency to be applicable when the concerned cells are not included in the *blackCellsToAddModList* defined within the *VarMeasConfig* for this *measId*;

4> else:

5> consider any neighbouring cell detected on the associated frequency to be applicable when the concerned cell is not included in the *blackCellsToAddModListEUTRAN* defined within the *VarMeasConfig* for this *measId*;

FIG. 11

5.5.4 Measurement report triggering
5.5.4.1 General

If security has been activated successfully, the UE shall:
1> for each *measId* included in the *measIdList* within *VarMeasConfig*:
  2> if *reportType* is set to *periodical* and if a (first) measurement result is available:
    3> include a measurement reporting entry within the *VarMeasReportList* for this *measId*;
    3> set the *numberOfReportsSent* defined within the *VarMeasReportList* for this *measId* to 0;
    3> if the *reportAmount* exceeds 1:
      4> initiate the measurement reporting procedure, as specified in 5.5.5, immediately after the quantity to be reported becomes available for the NR SpCell;
    3> else (i.e. the *reportAmount* is equal to 1):
      4> initiate the measurement reporting procedure, as specified in 5.5.5, immediately after the quantity to be reported becomes available for the NR SpCell and for the strongest cell among the applicable cells; or
      4> becomes available for each requested pair of PCell and E-UTRA cell or the maximal measurement reporting delay as specified in TS 38.133 [84], clause 8.17.2.3 in case of SFTD measurements; or
      4> becomes available for each requested pair of PCell and NR cell or the maximal measurement reporting delay as specified in TS 38.133 [84], clause 8.17.2.3 in case of SFTD measurements;

FIG.12

5.5.5 Measurement reporting

5.5.5.1 General

The purpose of this procedure is to transfer measurement results from the UE to the network. The UE shall initiate this procedure only after successful security activation.
For the *measId* for which the measurement reporting procedure was triggered, the UE shall set the *measResults* within the *MeasurementReport* message as follows:

1> if the *reportSFTD-MeasNEDC* is set to *neighborCells* or *pSCell* within the corresponding *reportConfigInterRAT* for this *measId*, for each applicable cell for which results are available:
  2> set *physCellIdEUTRA* to the E-UTRA physical cell ID of the applicable cell;
  2> set *sfn-OffsetResult* and *frameBoundaryOffsetResult* to the measurement results provided by lower layers;
  2> if the *reportQuantity* is set to *rsrp* within the corresponding *reportConfigInterRAT* for this *measId*:
    3> set *rsrp* in *measResultsEUTRA* to RSRP measured on the applicable cell;
  2> if the *reportQuantity* is set to *rsrq* within the corresponding *reportConfigInterRAT* for this *measId*:
    3> set *rsrq* in *measResultsEUTRA* to RSRQ measured on the applicable cell;
  2> if the *reportQuantity* is set to *sinr* within the corresponding *reportConfigInterRAT* for this *measId*:
    3> set *sinr* in *measResultsEUTRA* to RS-SINR measured on the applicable cell, if available;

1> if the *reportSFTD-MeasNRDC* is set to *neighborCells* or *pSCell* within the corresponding *reportConfigNR* for this *measId*, for each applicable cell for which results are available:
  2> set *physCellId* to the NR physical cell ID of the applicable cell;
  2> set *sfn-OffsetResult* and *frameBoundaryOffsetResult* to the measurement results provided by lower layers;
  2> if the *reportQuantityCell* is set to *rsrp* within the corresponding *reportConfigNR* for this *measId*:
    3> include *rsrpResult* set to the RSRP of the concerned cell;

FIG. 13

*MeasResultCellListSFTD information element*

```
-- ASN1START
-- TAG-MEASRESULT-CELL-LIST-SFTD-START

MeasResultCellListSFTD ::=       SEQUENCE (SIZE (1..maxCellsFTD)) OF MeasResultCellSFTD MeasResultCellListSFTD-NEDC ::=  SEQUENCE (SIZE (1..maxCellsFTD)) OF MeasResultCellSFTD-NEDC MeasResultCellSFTD ::=  SEQUENCE {
    physCellId                  PhysCellId,
    sfn-OffsetResult            INTEGER (0..1023),
    frameBoundaryOffsetResult   INTEGER (-30720..30719),
    rsrp-Result                 RSRP-Range                           OPTIONAL
}

MeasResultCellSFTD-NEDC ::=  SEQUENCE {
    physCellIdEUTRA             EUTRA-PhysCellId,
    sfn-OffsetResult            INTEGER (0..1023),
    frameBoundaryOffsetResult   INTEGER (-30720..30719),
    measResultEUTRA             MeasQuantityResultsEUTRA             OPTIONAL
}

-- TAG-MEASRESULT-CELL-LIST-SFTD-STOP
-- ASN1STOP
```

FIG.14

| MeasResultSFTD field descriptions |
|---|
| *sfn-OffsetResult* <br> Indicates the SFN difference between the PCell and the NR cell as an integer value according to TS 38.215 [9]. |
| *frameBoundaryOffsetResult* <br> Indicates the frame boundary difference between the PCell and the NR cell as an integer value according to TS 38.215 [9]. |
| *measResultEUTRA* <br> Measurements result(s) (RSRP/RSRQ/RS-SINR) for the E-UTRA cell. |
| *physCellId* <br> Physical cell ID of the NR Cell for which SFN and frame boundary difference from PCell in E-UTRA is reported. |
| *physCellIdEUTRA* <br> Physical cell ID of the E-UTRA cell for which SFN and frame boundary difference from PCell in NR is reported. |

FIG.15

ReportConfigInterRAT information element

```
PeriodicalReportConfigInterRAT ::=      SEQUENCE {
    reportInterval                          ReportInterval,
    reportAmount
                                            ENUMERATED {r1, r2, r4, r8, r16, r32, r64,
    infinity},
    reportQuantity                          MeasReportQuantity,
    maxReportCells                          INTEGER (1..maxCellReport),
    ...,
    [[
    reportSFTD-MeasNEDC     ENUMERATED {pSCell, neighborCells}    OPTIONAL    -- Need N
    ]]
}
```

| PeriodicalReportConfigInterRAT field descriptions |
|---|
| *reportSFTD-MeasNEDC*<br>If this field is set to *pSCell*, the UE shall measure SFTD between the PCell and the PSCell as specified in TS 38.215 [9], in this case, the frequency of PSCell is configured in the corresponding *measObjectEUTRA*. If the field is set to *neighborCells*, the UE shall measure SFTD between the PCell and the E-UTRA cells included in *cellsForWhichToReportSFTD-NEDC* (if configured in the corresponding *measObjectEUTRA*) or between the PCell and up to 3 strongest detected E-UTRA cells (if *cellsForWhichToReportSFTD-NEDC* is not configured in the corresponding *measObjectEUTRA*), as specified in TS 38.215 [9]. If this field is included, the UE shall ignore the *maxReportCells* field. |

FIG.16

ReportConfigNR information element

```
PeriodicalReportConfig ::=         SEQUENCE {
    rsType                          NR-RS-Type,
    reportInterval                  ReportInterval,
    reportAmount                    ENUMERATED {r1, r2, r4, r8, r16, r32, r64, infinity},
    reportQuantityCell              MeasReportQuantity,
    maxReportCells                  INTEGER (1..maxCellReport),
    reportQuantityRS-Indexes        MeasReportQuantity                              OPTIONAL,    -- Need R
    maxNrofRS-IndexesToReport       INTEGER (1..maxNrofIndexesToReport)             OPTIONAL,    -- Need R
    includeBeamMeasurements         BOOLEAN,
    useWhiteCellList                BOOLEAN,
    ...,
    [[
    reportSFTD-MeasNRDC-r16         ENUMERATED {pSCell, neighborCells}              OPTIONAL     -- Need N
    ]]
}
```

PeriodicalReportConfig field descriptions

*reportSFTD-MeasNRDC*
If this field is set to *pSCell*, the UE shall measure SFTD between the PCell and the PSCell as specified in TS 38.215 [9]. In this case, the frequency of PSCell is configured in the corresponding *measObjectNR*. If the field is set to *neighborCells*, the UE shall measure SFTD between the PCell and the NR cells included in *cellsForWhichToReportSFTD-NRDC* (if configured in the corresponding *measObjectNR*) or between the PCell and up to 3 strongest detected NR cells (if *cellsForWhichToReportSFTD-NRDC* is not configured in the corresponding *measObjectNR*), as specified in TS 38.215 [9]. If this field is included, the UE shall ignore the *maxReportCells* field.

FIG. 17

5.5.5 Measurement reporting

5.5.5.1 General

The purpose of this procedure is to transfer measurement results from the UE to the network. The UE shall initiate this procedure only after successful security activation.
For the *measId* for which the measurement reporting procedure was triggered, the UE shall set the *measResults* within the *MeasurementReport* message as follows:

1> if the *reportSFTD-MeasNEDC* is set to *neighborCells* or *pSCell* within the corresponding *reportConfigInterRAT* for this *measId*, for each applicable cell for which results are available:
   2> set *physCellIdEUTRA* to the E-UTRA physicall cell ID of the applicable cell;
   2> set *sfn-OffsetResult* and *frameBoundaryOffsetResult* to the measurement results provided by lower layers;
   2> if the *reportQuantity* is set to *rsrp* within the corresponding *reportConfigInterRAT* for this *measId*:
      3> set *rsrp* in *measQuantityResultsEUTRA* to RSRP measured on the applicable cell;
   2> if the *reportQuantity* is set to *rsrq* within the corresponding *reportConfigInterRAT* for this *measId*:
      3> set *rsrq* in *measQuantityResultsEUTRA* to RSRQ measured on the applicable cell;
   2> if the *reportQuantity* is set to *sinr* within the corresponding *reportConfigInterRAT* for this *measId*:
      3> set *sinr* in *measQuantityResultsEUTRA* to RS-SINR measured on the applicable cell, if available;

1> if the *reportSFTD-MeasNRDC* is set to *neighborCells* or *pSCell* within the corresponding *reportConfigNR* for this *measId*, for each applicable cell for which results are available:
   2> set *physCellId* to the NR physicall cell ID of the applicable cell;
   2> set *sfn-OffsetResult* and *frameBoundaryOffsetResult* to the measurement results provided by lower layers;
   2> if the *reportQuantityCell* is set to *rsrp* within the corresponding *reportConfigNR* for this *measId*:
      3> set *rsrp* in *measQuantityResults* to RSRP measured on the applicable cell;
   2> if the *reportQuantityCell* is set to *rsrq* within the corresponding *reportConfigNR* for this *measId*:
      3> set *rsrq* in *measQuantityResults* to RSRQ measured on the applicable cell;
   2> if the *reportQuantityCell* is set to *sinr* within the corresponding *reportConfigNR* for this *measId*:
      3> set *sinr* in *measQuantityResults* to SINR measured on the applicable cell;

FIG.18

MeasResultCellListSFTD information element

```
-- ASN1START
-- TAG-MEASRESULT-CELL-LIST-SFTD-START

MeasResultCellListSFTD ::=          SEQUENCE (SIZE (1..maxCellSFTD)) OF MeasResultCellSFTD MeasResultCellListSFTD-r15 ::=      SEQUENCE (SIZE (1..maxCellSFTD)) OF MeasResultCellsSFTD-r15

MeasResultCellSFTD ::=     SEQUENCE {
    physCellId                     PhysCellId,
    sfn-OffsetResult               INTEGER (0..1023),
    frameBoundaryOffsetResult      INTEGER (-30720..30719),
    rsrp-Result                    RSRP-Range                               OPTIONAL
}

MeasResultCellSFTD-r15 ::=  SEQUENCE {
    physCellId                     CHOICE {
        eutra                          EUTRA-PhysCellId,
        nr                             PhysCellID
    },
    sfn-OffsetResult               INTEGER (0..1023),
    frameBoundaryOffsetResult      INTEGER (-30720..30719),
    measResults                    CHOICE {
        eutra                          MeasQuantityResultsEUTRA,
        nr                             MeasQuantityResults
    }                                                                       OPTIONAL
}

-- TAG-MEASRESULT-CELL-LIST-SFTD-STOP
-- ASN1STOP
```

FIG.19

| MeasResultSFTD field descriptions |
|---|
| *sfn-OffsetResult*<br>Indicates the SFN difference between the PCell and the NR cell as an integer value according to TS 38.215 [9]. |
| *frameBoundaryOffsetResult*<br>Indicates the frame boundary difference between the PCell and the NR cell as an integer value according to TS 38.215 [9]. |
| *measResults*<br>Measurements result(s) (RSRP/RSRQ/RS-SINR) for the E-UTRA cell or the NR cell. |
| *physCellId*<br>Physical cell ID of the NR Cell for which SFN and frame boundary difference from PCell in E-UTRA is reported. |
| *physCellIdEUTRA*<br>Physical cell ID of the E-UTRA cell for which SFN and frame boundary difference from PCell in NR is reported. |

USER APPARATUS

TECHNICAL FIELD

The present invention relates to a user apparatus in a radio communication system.

BACKGROUND ART

For NR (New Radio) (which is also referred to as "5G") that is a successor system to LTE (Long Term Evolution), technology has been studied that meets requirements, such as those of a large capacity system, a high data transmission rate, low latency, simultaneous connection of multiple terminals, low cost, and power saving (e.g., Non-Patent Document 1).

In an NR system, similar to dual connectivity in an LTE system, a technique called LTE-NR dual connectivity, NR-NR dual connectivity, or Multi Radio Access Technology (Multi-RAT) dual connectivity (which is referred to as "MR-DC," hereinafter) has been introduced such that data is divided between a base station of an LTE system (eNB) and a base station of an NR system (gNB) and data is simultaneously transmitted and received by these base stations (e.g., Non-Patent Document 2). Furthermore, for LTE-NR dual connectivity, SFN and Frame Timing Difference (SFTD) is supported in which a user apparatus measures a System Frame Number (SFN) and subframe timing difference between an eNB that is the master node and a gNB that is the secondary node and the user apparatus reports the difference to a network (e.g., Non-Patent Document 3).

RELATED ART DOCUMENT

Non-Patent Document

Non-Patent Document 1: 3GPP TS 38.300 V15.4.0(2018-12)
Non-Patent Document 2: 3GPP TS 37.340 V15.4.0(2018-12)
Non-Patent Document 3: 3GPP TS 38.215 V15.4.0(2018-12)

SUMMARY OF THE INVENTION

Problem to be Solved by the Invention

For performing asynchronous dual connectivity in NR-NR dual connectivity or NR-LTE dual connectivity in which a gNB is the master node, since an amount of a frame difference, a slot difference, or a symbol timing difference between the gNB that is the master node and a gNB or an eNB that is the secondary node is unknown, a user apparatus is to perform a measurement of a cell of the gNB or the eNB. However, a procedure of the measurement is not well-defined.

The present invention has been accomplished in view of the above-described point, and an object is for a user apparatus to perform a measurement of a timing difference in dual connectivity executed in a radio communication system.

Means for Solving the Problem

According to the disclosed technology, there is provided a user apparatus including a communication unit configured to communicate with a first base station apparatus and a second base station apparatus, wherein the first base station apparatus is a master node in a New Radio (NR) radio communication system and the second base station apparatus is a secondary node in the NR radio communication system; a reception unit configured to receive from the first base station apparatus an instruction to measure an system frame number and frame timing difference (SFTD) representing a system frame number and frame timing difference between cells; a control unit configured to measure SFTD between a cell of the first base station apparatus and a cell of the second base station apparatus based on the instruction to measure SFTD; and a transmission unit configured to transmit to the first base station apparatus a measurement result including the measured SFTD.

Advantage of the Invention

According to the disclosed technology, a user apparatus can execute a measurement of a timing difference in dual connectivity executed in a radio communication system.

BRIEF DESCRIPTION OF DRAWINGS

FIG. 4 is a flowchart for illustrating a first operation example according to an embodiment of the present invention.

FIG. 5 is a flowchart for illustrating a second operation example according to an embodiment of the present invention.

FIG. 6 is a modified example of a specification for an operation example according to an embodiment of the present invention.

FIG. 7 is a modified example (1) of a specification for a first operation example according to an embodiment of the present invention.

FIG. 8 is a modified example (2) of a specification for a first operation example according to an embodiment of the present invention.

FIG. 9 is a modified example (3) of a specification for a first operation example according to an embodiment of the present invention.

FIG. 10 is a modified example (4) of a specification for a first operation example according to an embodiment of the present invention.

FIG. 11 is a modified example (5) of a specification for a first operation example according to an embodiment of the present invention.

FIG. 12 is a modified example (6) of a specification for a first operation example according to an embodiment of the present invention.

FIG. 13 is a modified example (7) of a specification for a first operation example according to an embodiment of the present invention.

FIG. 14 is a modified example (8) of a specification for a first operation example according to an embodiment of the present invention.

FIG. 15 is a modified example (9) of a specification for a first operation example according to an embodiment of the present invention.

FIG. 16 is a modified example (10) of a specification for a first operation example according to an embodiment of the present invention.

FIG. 17 is a modified example (1) of a specification for a second operation example according to an embodiment of the present invention.

FIG. 18 is a modified example (2) of a specification for a second operation example according to an embodiment of the present invention.

FIG. 19 is a modified example (3) of a specification for a second operation example according to an embodiment of the present invention.

EMBODIMENTS OF THE INVENTION

In the following, embodiments of the present invention are described with reference to the drawings. The embodiments described below are merely examples, and embodiments to which the present invention is applied are not limited to the embodiments described below.

In operating a radio communication system according to an embodiment of the present invention, existing technology is used as appropriate. Here, the existing technology is, for example, the existing LTE. However, the existing technology is not limited to the existing LTE. The term "LTE" as used in this specification has a broad meaning including LTE-Advanced and schemes subsequent to LTE-Advanced (e.g., NR), unless as otherwise specified.

In the embodiments of the present invention described below, terms used in the existing LTE are used, such as SS (Synchronization signal), PSS (Primary SS), SSS (Secondary SS), PBCH (Physical broadcast channel), and PRACH (Physical random access channel). This is for convenience of description, and signals, functions, and the like similar to these may be referred to by other names. The above-described terms in NR correspond to NR-SS, NR-PSS, NR-SSS, NR-PBCH, NR-PRACH, and so forth. However, even if a signal is used for NR, the signal is not always specified as "NR-."

In the embodiments of the present invention, a duplex method may be a Time Division Duplex (TDD) method, a Frequency Division Duplex (FDD) method, or any other method (e.g., Flexible Duplex).

In the embodiments of the present invention, "configuring" a radio parameter, or the like, may be "pre-configuring" a predetermined value, or configuring a radio parameter transmitted from a base station apparatus 10 or a user apparatus 20.

Figure 1:
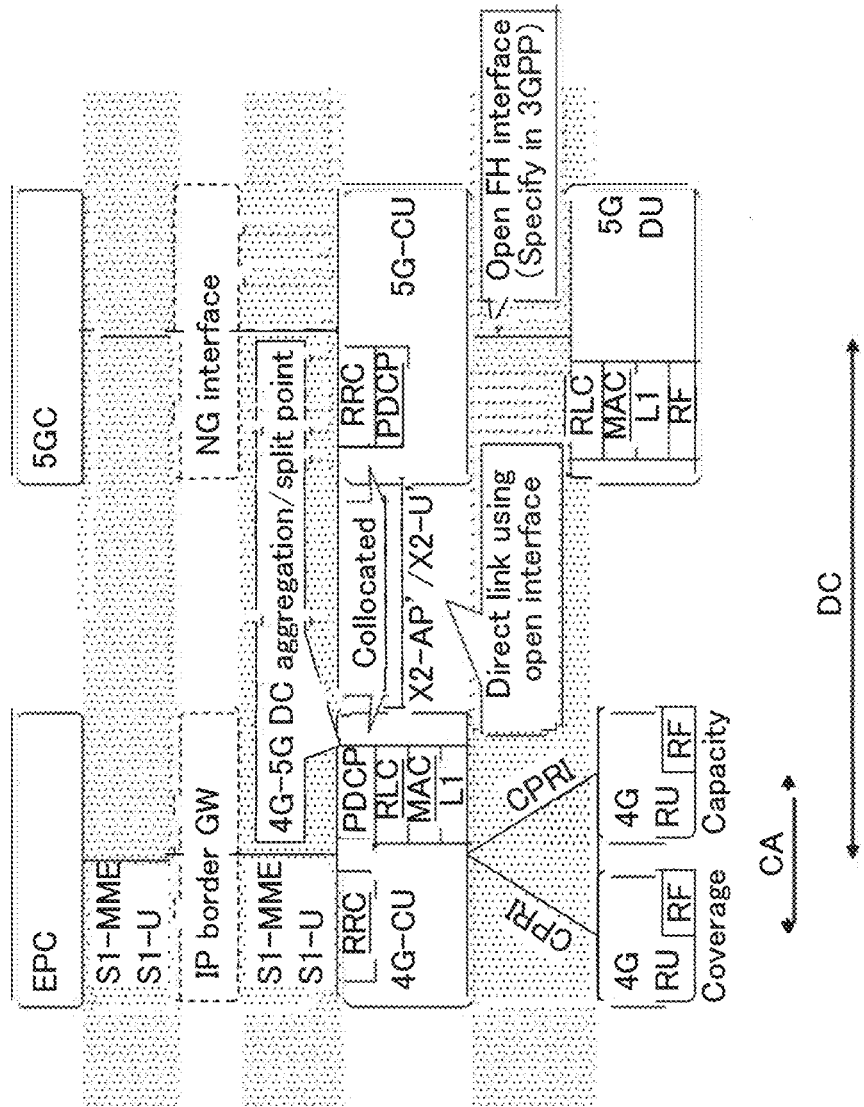
FIG. 1 is a diagram illustrating an example of a configuration of a network architecture according to an embodiment of the present invention.

FIG. 1 is a diagram illustrating an example of a configuration of a network architecture in the embodiments of the present invention. As illustrated in FIG. 1, a radio network architecture according to an embodiment of the present invention includes 4G-CU, 4G-RU (Remote Unit, remote radio station), an Evolved Packet Core (EPC), and the like, at an LTE-Advanced side. The radio network architecture according to the embodiment of the present invention includes 5G-CU, 5G-DU, and the like, at a 5G side.

As illustrated in FIG. 1, 4G-CU includes layers up to the Radio Resource Control (RRC), Packet Data Convergence Protocol (PDCP), Radio Link Control (RLC), Medium Access Control (MAC), and L1 (Layer 1, PHY layer or physical layer) and is connected to 4G-RU via Common Public Radio Interface (CPRI). A network node including 4G-CU and 4G-RU is referred to as eNB.

On the 5G side, as illustrated in FIG. 1, 5G-CU includes an RRC layer; is connected to 5G-DU via a Fronthaul (FH) interface; and is connected to 5G Core Network (5GC) via an NG interface. 5G-CU is also connected to 4G-CU via an X2 interface. The PDCP layer in 4G-CU is a coupling point or a separation point for performing 4G-5G Dual Connectivity (DC), i.e., E-UTRA-NR Dual Connectivity (EN-DC). A network node including 5G-CU and 5G-DU is referred to as gNB. 5G-CU may also be referred to as gNB-CU, and the 5G-DU may be referred to as gNB-DU.

As illustrated in FIG. 1, a Carrier Aggregation (CA) is performed between 4G and RU, and DC is performed between 4G-RU and 5G-DU. Note that, though it is not depicted, a User Equipment (UE) is wirelessly connected via 4G-RU RF or 5G-DU RF to transmit and receive packets.

Note that FIG. 1 illustrates a radio network architecture for LTE-NR DC, i.e., EN-DC (E-UTRA-NR Dual Connectivity (EN-DC). However, a similar radio network architecture may be used when 4G-CU is separated into CU-DU or when NR standalone operation is performed. When the 4G-CU is separated into CU-DU, functions related to the RRC layer and the PDCP layer may be moved to 4G-CU and the RLC layer or lower may be included in 4G-DU. Here, a CPRI data rate may be reduced by CU-DU separation.

A plurality of 5G-DUs may be connected to 5G-CU. Furthermore, NR-NR Dual Connectivity (NR-DC) may be performed by connecting a UE to a plurality of 5G-CUs, or NR-DC may be performed by connecting a UE to a plurality of 5G-DUs and a single 5G-CU.

Figure 2:
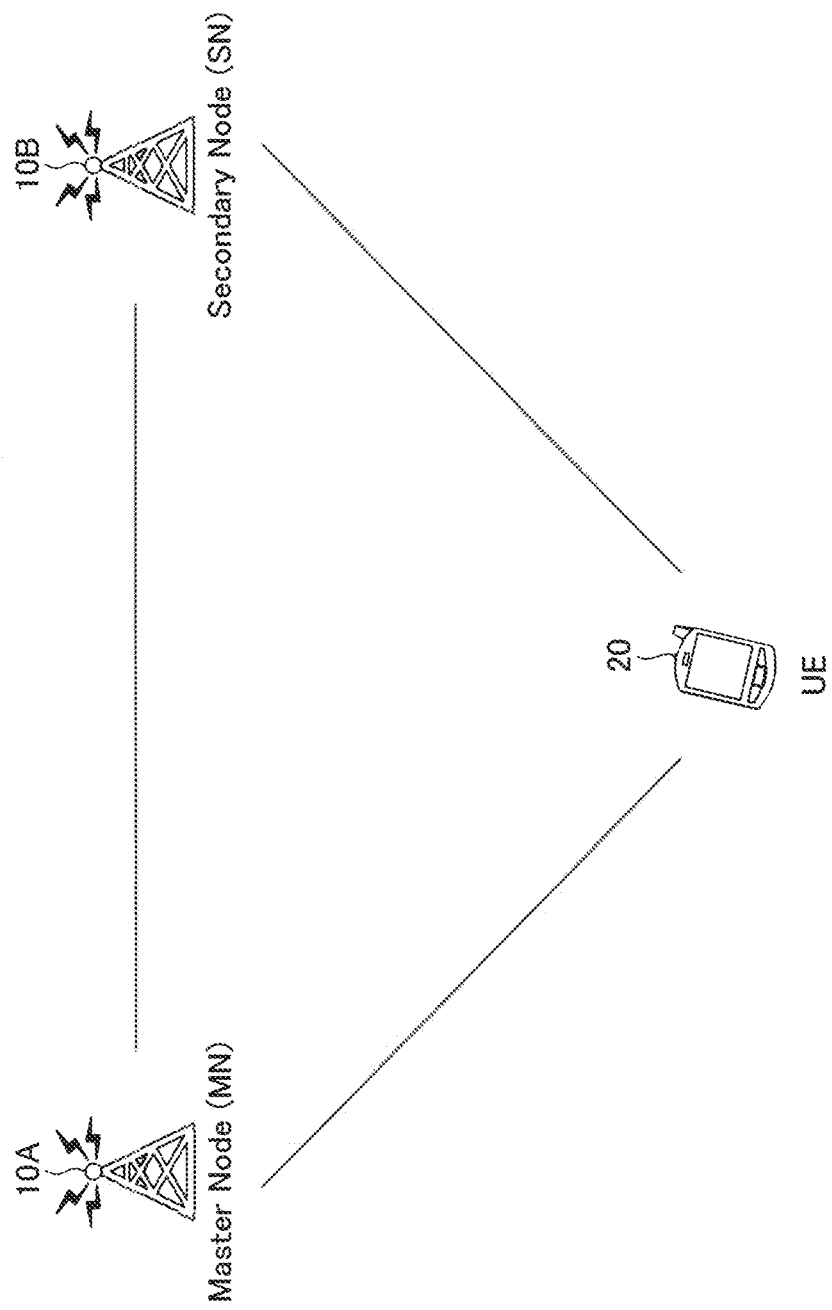
FIG. 2 is a diagram illustrating an example of a configuration of a radio communication system according to an embodiment of the present invention.

FIG. 2 is a diagram illustrating an example of a configuration of a radio communication system according to an embodiment of the present invention. FIG. 2 is a schematic diagram illustrating a radio communication system for Multi-RAT Dual Connectivity (MR-DC).

As illustrated in FIG. 2, a user apparatus 20 communicates with a base station apparatus 10A provided by an NR system and a base station apparatus 10B provided by the NR system (hereinafter, referred to as "base station apparatuses 10" for a case where the base station apparatus 10A and the base station apparatus 10B are not distinguished). In addition, the user apparatus 20 supports NR-NR dual connectivity, that is, NR-DC, where the base station apparatus 10A is used as a master node (hereinafter referred to as "MN") and the base station apparatus 10B is used as a secondary node (hereinafter referred to as "SN"). The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

As illustrated in FIG. 2, the user apparatus 20 may communicate with the base station apparatus 10A provided by an LTE system and the base station apparatus 10B provided by an NR system. In addition, the user apparatus 20 may support LTE-NR dual connectivity, that is, EN-DC, where the base station apparatus 10A is used as an MN and the base station apparatus 10B is used as an SN. The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

As illustrated in FIG. 2, the user apparatus 20 may communicate with the base station apparatus 10A provided by an NR system and the base station apparatus 10B provided by an LTE system. In addition, the user apparatus 20 may support NR-LTE dual connectivity, that is, NR-E-UTRA Dual Connectivity (NE-DC), where the base station apparatus 10A is used as an MN and the base station apparatus 10B is used as an SN. The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

Although the following embodiment is described assuming NR-NR dual connectivity, NR-LTE dual connectivity, or LTE-NR dual connectivity, the user apparatus 20 according to the embodiment of the present invention is not limited to the dual connectivity described above, and is applicable to dual connectivity among a plurality of radio communication systems using different RATs, that is, MR-DC.

Figure 3:
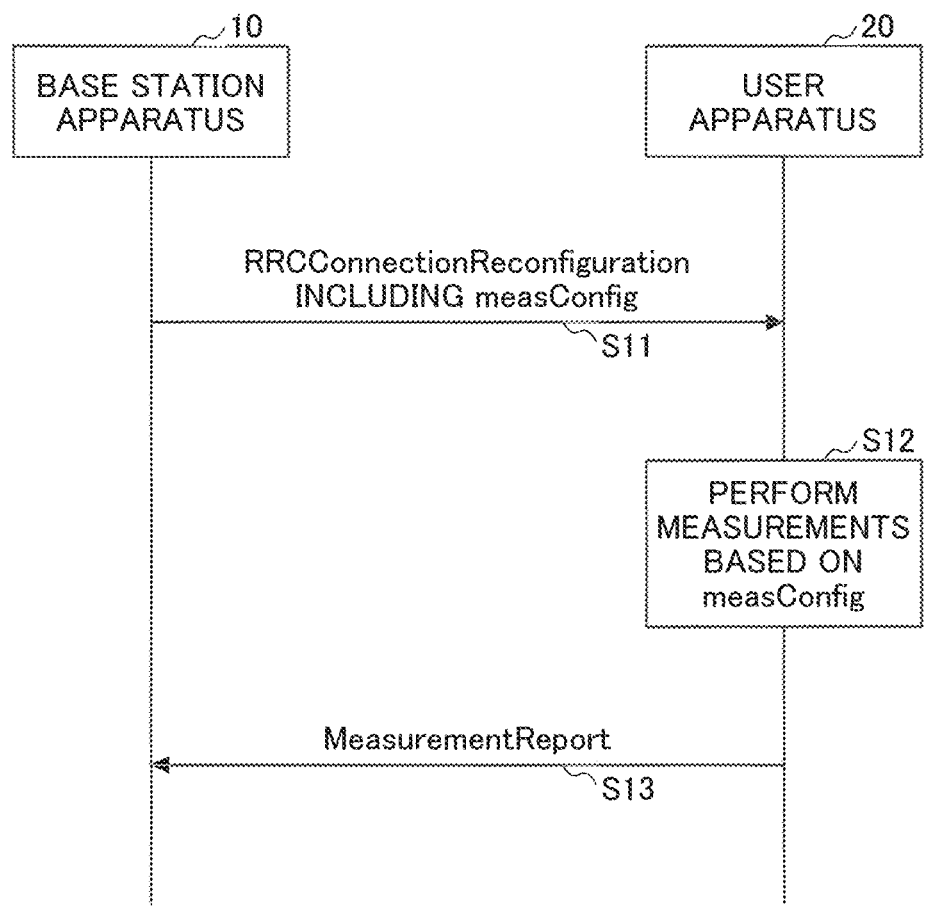
FIG. 3 is a sequence diagram for illustrating an operation example according to an embodiment of the present invention.

FIG. 3 is a sequence diagram illustrating an operation example according to an embodiment of the present invention. In step S1, the base station apparatus 10 transmits RRCConnectionReconfiguration including an information element measConfig to the user apparatus 20 using an RRC message. The measConfig includes information on a configuration of a measurement performed by the user apparatus 20. For example, information on an intra-frequency measurement, an inter-frequency measurement, an inter-RAT mobility measurement, a measurement gap configuration, and so forth may be included. Note that the RRCConnectionReconfiguration is an example, and the measConfig may be sent by using another RRC message. For example, measConfig may be transmitted to the user apparatus 20 by using RRCConnectionResume.

In step S2, the user apparatus 20 performs a measurement based on a configuration according to the measConfig received in step S1. A necessary measurement is performed on an LTE cell or an NR cell. According to the embodiment of the present invention, the user apparatus 20 mainly performs an SFTD measurement.

A case is assumed in which asynchronous DC is executed with an NR master node and an NR or LTE secondary node. In asynchronous DC, an amount of a radio frame difference, a slot difference, or a symbol timing difference between a master node and a secondary node is unknown. For DC, an SFTD measurement is supported where SFN and frame timing between a master node (corresponding to a "Primary Cell") and a secondary node (corresponding to a "Primary Secondary Cell") are measured by the user apparatus 20 and the measurement results are reported to the base station apparatus 10. By performing the SFTD measurement, an active period of Discontinuous reception (DRX) can be synchronized between the master node and the secondary node, for example. According to the SFTD measurement of NR, the user apparatus 20 measures an SFN offset and a frame boundary offset between a PCell and a PSCell and reports the measurement results to the base station apparatus 10.

In step S3, the user apparatus 20 transmits the result of the measurement executed in step S2 to the base station apparatus 10 by using an RRC message, MeasurementReport. The base station apparatus 10 configures and schedules a radio resource for the user apparatus 20 by referring to the received measurement result.

FIG. 4 is a flowchart illustrating a first operation example according to an embodiment of the present invention. Step S12 is substantially the same as step S12 illustrated in FIG. 3. The flowchart illustrated in FIG. 4 is implemented by the user apparatus 20 that performs communication according to NR-DC or NE-DC. A master node is a gNB and a secondary node is a gNB or an eNB.

In step S121a, the user apparatus 20 determines whether an E-UTRA PSCell measurement for SFTD or a neighboring cell measurement for SFTD is configured. Upon determining that the measurement is configured (YES at S121a), the process proceeds to step S122a. Upon determining that the measurement is not configured (NO at S121a), the process proceeds to step S124a.

In step S122a, the user apparatus 20 performs an SFTD measurement between an SFTD measurement applicable cell and an NR PCell. In addition, the user apparatus 20 may measure Reference Signal Received Power (RSRP), Reference Signal Received Quality (RSRQ) or Reference Signal—Signal to Interference plus Noise power Ratio (RS-SINR) of the SFTD measurement applicable cell. In a case where the SFTD measurement applicable cell is a neighboring cell and no cell is specified, up to three strongest cells with favorable reception environments may be used as SFTD measurement applicable cells.

In step S123a, the user apparatus 20 stores an SFTD measurement result in an Information Element (IE) for NE-DC, configures measResults with the measurement result, and proceeds to step S124a. The measResults is an IE included in MeasurementReport.

In step S124a, the user apparatus 20 determines whether an NR PSCell measurement for SFTD or a neighboring cell measurement for SFTD is configured. Upon determining that the measurement is configured (YES at S124a), the process proceeds to step S125a. Upon determining that the measurement is not configured (NO of S124a), the flow ends.

In step S125a, the user apparatus 20 performs an SFTD measurement between an SFTD measurement applicable cell and an NR PCell. In addition, the user apparatus 20 may measure RSRP of the SFTD measurement applicable cell. In a case where the SFTD measurement applicable cell is a neighboring cell and no cell is specified, up to three strongest cells with favorable reception environments may be used as SFTD measurement applicable cells.

In step S126a, the user apparatus 20 stores an SFTD measurement result in an IE for EN-DC, configures measResults with the measurement result, and terminates the flow. Steps S122a and S123a may be executed before or after steps S125a and 126a, or may be executed in parallel with steps S125a and 126a.

FIG. 5 is a flowchart illustrating a second operation example according to an embodiment of the present invention. Step S12 is substantially the same as step S12 illustrated in FIG. 3. The flowchart illustrated in FIG. 5 is implemented by the user apparatus 20 that performs communication according to NR-DC or NE-DC. A master node is a gNB and a secondary node is a gNB or an eNB.

In step S121b, the user apparatus 20 determines whether an E-UTRA PSCell measurement for SFTD or a neighboring cell measurement for SFTD is configured. Upon determining that the measurement is configured (YES at S121b), the process proceeds to step S122b. Upon determining that the measurement is not configured (NO at S121b), the process proceeds to step S124b.

In step S122b, the user apparatus 20 performs an SFTD measurement between an SFTD measurement applicable cell and an NR PCell. In addition, the user apparatus 20 may measure RSRP, RSRQ, or RS-SINR of the SFTD measurement applicable cell. In a case where the SFTD measurement applicable cell is a neighboring cell and no cell is specified, up to three strongest cells with favorable reception environments may be used as SFTD measurement applicable cells.

In step S123b, the user apparatus 20 stores an SFTD measurement result in an IE for NE-DC or NR-DC, configures measResults with the measurement result, and proceeds to step S124b.

In step S124b, the user apparatus 20 determines whether an NR PSCell measurement for SFTD or a neighboring cell measurement for SFTD is configured. Upon determining that the measurement is configured (YES at S124b), the process proceeds to step S125b. Upon determining that the measurement is not configured (NO at S124b), the flow ends.

In step S125b, the user apparatus 20 performs an SFTD measurement between an SFTD measurement applicable cell and an NR PCell. In addition, the user apparatus 20 may measure RSRP, RSRQ, or SINR of the SFTD measurement applicable cell. In a case where the SFTD measurement applicable cell is a neighboring cell and no cell is specified, up to three strongest cells with favorable reception environment may be used as SFTD measurement applicable cells.

In step S126b, the user apparatus 20 stores an SFTD measurement result in an IE for NE-DC or NR-DC, configures measResults with the measurement result, and ends the flow. Steps S122b and S123b may be executed before or after steps S125b and S126b, or may be executed in parallel with steps S125b and S126b.

FIG. 6 is a modified example of a specification for an operation example according to an embodiment of the present invention. As illustrated in FIG. 6, it is specified to measure SFTD between a PCell and a PSCell in MR-DC. MR-DC may be EN-DC, NE-DC, or NR-DC.

FIG. 7 is a modified example of a specification for a first operation example in an embodiment of the present invention. As illustrated in FIG. 7, a report on an SFTD measurement in NE-DC is configured by using an information element reportSFTD-MeasNEDC. Furthermore, by an information element reportSFTD-MeasNRDC, a report on an SFTD measurement in NR-DC is configured.

FIG. 8 is a modified example (2) of a specification for the first operation example in the embodiment of the present invention. As illustrated in FIG. 8, an operation is specified when measObject including an information element other than an information element cellsForWhichToReportSFTD-NEDC or an information element cellsForWhichToReportSFTD-NRDC is received.

FIG. 9 is a modified example (3) of a specification for the first operation example in the embodiment of the present invention. As illustrated in FIG. 9, if an information element reportSFTD-MeasNEDC is set to a PSCell, SFTD between an NR PCell and an E-UTRA PSCell is to be reported. If the information element reportSFTD-MeasNEDC is set to neighboring cells, one or more SFTDs between an NR PCell and one or more E-UTRA neighboring cells on the indicated frequency are to be reported.

In addition, as illustrated in FIG. 9, in a case where an information element reportSFTD-MeasNRDC is set to a PSCell, SFTD between a NR PCell and an NR PSCell is to be reported. In a case where the information element reportSFTD-MeasNRDC is set to neighboring cells, one or more SFTDs between an NR PCell and one or more NR neighboring cells on the indicated frequency are to be reported.

FIG. 10 is a modified example (4) of a specification on the first operation example of the embodiment of the present invention. As illustrated in FIG. 10, if an information element reportSFTD-MeasNRDC is set to a PSCell, an NR PSCell is to be an SFTD measurement applicable cell. If the information element reportSFTD-MeasNRDC is set to neighboring cells, a cell included in an information element cellsForWhichToReportSFTD-NRDC is to be an SFTD measurement applicable cell; an NR cell on a specified frequency included in the information element cellsForWhichToReportSFTD-NRDC is to be an SFTD measurement applicable cell; or up to three strongest NR cells with favorable reception environments from among NR cells not included in an information element blackCellsToAddModList on the indicated frequency are to be SFTD measurement applicable cells.

Furthermore, as illustrated in FIG. 10, if an information element reportSFTD-MeasNEDC is set to a PSCell, an E-UTRA PSCell is to be an SFTD measurement applicable cell. If the information element reportSFTD-MeasNEDC is set to neighboring cells, a cell included in an information element cellsForWhichToReportSFTD-NEDC is to be an SFTD measurement applicable cell; an E-UTRA cell on a specified frequency included in the information element cellsForWhichToReportSFTD-NEDC is to be a SFTD measurement applicable cell; or up to three strongest E-UTRA cells with favorable reception environments on the indicated frequency not included in an information element blackCellsToAddModList are to be SFTD measurement applicable cells.

FIG. 11 is a modified example (5) of a specification on the first operation example of the embodiment of the present invention. As illustrated in FIG. 11, the maximal delay in reporting SFTD between a PCell and an E-UTRA cell is specified. In addition, the maximal delay in reporting SFTD between a PCell and an NR cell is specified.

FIG. 12 is a modified example (6) of a specification on the first operation example of the embodiment of the present invention. As illustrated in FIG. 12, if an E-UTRA neighboring cell or a PSCell is a measurement applicable cell, an E-UTRA physical cell ID of the measurement applicable cell is set to an information element physCellIdEUTRA. The measurement results provided by lower layers are set to an information element sfn-OffsetResult and an information element frameBoundaryOffsetResult. If the reportQuantity is set to rsrp, RSRP of the measurement applicable cell is set to rsrp of an information element measResultsEUTRA. If rsrq is set to the information element reportQuantity, RSRQ of the measurement applicable cell is set to rsrq of the information element measResultsEUTRA. If sinr is set to the information element reportQuantity, RS-SINR of the measurement applicable cell is set to sinr of the information element measResultsEUTRA.

As illustrated in FIG. 12, if NR neighboring cells or a PSCell is a measurement applicable cell, a NR physical cell ID of the measurement applicable cell is set to an information element physCellId. Measurement results provided by lower layers are set to an information element sfn-OffsetResult and an information element frameBoundaryOffsetResult. If rsrp is set to an information element reportQuantityCell, RSRP of the measurement applicable cell is set to an information element rsrpResult.

FIG. 13 is a modified example (7) of a specification on the first operation example of the embodiment of the present invention. As illustrated in FIG. 13, an information element MeasResultCellSFTD-NEDC includes an information element physCellIdEUTRA to which an E-UTRA physical cell ID is set; an information element sfn-OffsetResult to which an SFN offset is set; an information element frameBoundaryOffsetResult to which a frame boundary offset is set; and an information element measResultEUTRA to which one or more from among RSRP, RSRQ, and RS-SINR are set.

FIG. 14 is a modified example (8) of a specification on the first operation example of the embodiment of the present invention. As illustrated in FIG. 14, an SFN offset is set to an information element sfn-OffsetResult. A frame boundary offset is set to an information element frameBoundaryOffsetResult. One or more from among RSRP, RSRQ, and RS-SINR are set to an information element measResultEUTRA. An NR physical cell ID is set to an information element physCellId. An E-UTRA physical cell ID is set to an information element physCellIdEUTRA.

FIG. 15 is a modified example (9) of a specification on the first operation example of the embodiment of the present invention. As illustrated in FIG. 15, an E-UTRA PSCell or neighboring cells are set to an information element reporSFTD-MeasNEDC as measurement applicable cells. If neighboring cells are set, the cells are directly indicated or up to three strongest cells with favorable reception environments are to be the measurement applicable cells.

FIG. 16 is a modified example (10) of a specification on the first operation example in the embodiment of the present invention. As illustrated in FIG. 16, an NR PSCell or neighboring cells are set to an information element reporSFTD-MeasNRDC as measurement applicable cells. If neighboring cells are set, the cells are directly indicated or up to three strongest cells with favorable reception environments are set to the measurement applicable cells.

FIG. 17 is a modified example (1) of a specification on a second operation example according to an embodiment of the present invention. As illustrated in FIG. 17, if E-UTRA neighboring cells or PSCell is a measurement applicable cell, an E-UTRA physical cell ID of a measurement applicable cell is set to an information element physCellIdEUTRA. Measurement results provided by lower layers are set to an information element sfn-OffsetResult and an information element frameBoundaryOffsetResult. If rsrp is set to an information element reportQuantity, RSRP of the measurement applicable cell is set to rsrp of an information element measQuantityResultsEUTRA. If rsrq is set to the information element reportQuantity, RSRQ of the measurement applicable cell is set to rsrq of the information element measQuantityResultsEUTRA. If sinr is set to the information element reportQuantity, RS-SINR of the measurement applicable cell is set to sinr of the information element measQuantityResultsEUTRA.

As illustrated in FIG. 17, if NR neighboring cells or PSCell is used as a measurement applicable cell, an NR physical cell ID of a measurement applicable cell is set to an information element physCellId. Measurement results provided by lower layers are set to an information element sfn-OffsetResult and an information element frameBoundaryOffsetResult. If rsrp is set to an information element reportQuantityCell, RSRP of the measurement applicable cell is set to an information element measQuantityResults. If rsrq is set to the information element reportQuantityCell, RSRQ of the measurement applicable cell is set to rsrq of the information element measQuantityResults. If sinr is set to the information element reportQuantityCell, SINR of the measurement applicable cell is set to sinr of the information element measQuantityResults.

FIG. 18 is a modified example (2) of a specification on the second operation example according to the embodiment of the present invention. As illustrated in FIG. 18, an information element MeasResultCellSFTD-r15 includes an information element PhysCellIdEUTRA to which an E-UTRA physical cell ID is set or an information element PhysCellId to which a NR physical cell ID is set; an information element sfn-OffsetResult to which a SFN offset is set; an information element frameBoundaryOffsetResult to which a frame boundary offset is set; and an information element measQuantityResultsEUTRA to which one or more from among RSRP, RSRQ, and RS-SINR are set or an information element measQuantityResults to which one or more from among RSRP, RSRQ, and SINR are set. That is, the information element MeasResultCellSFTD-r15 is an information element compatible with both reporting SFTD measurement results for NE-DC and reporting SFTD measurement results for NR-DC.

FIG. 19 is a modified example (3) of a specification on the second operation example according to the embodiment of the present invention. As illustrated in FIG. 19, an SFN offset is set to an information element sfn-OffsetResult. A frame boundary offset is set to an information element frameBoundaryOffsetResult. One or more from among E-UTRA RSRP, E-UTRA RSRQ, and E-UTRA RS-SINR or one or more from among NR RSRP, NR RSRQ, and NR SINR are set to an information element measResults. An NR physical cell ID is set to an information element physCellId. An E-UTRA physical cell ID is set to an information element physCellIdEUTRA.

According to the above-described embodiments, the user apparatus 20 can perform an SFTD measurement between an E-UTRA or NR measurement applicable cell and a NR PCell, and report SFTD measurement results, including RSRP, RSRQ, or SINR measurement result as needed, to the base station apparatus 10.

Namely, a user apparatus can perform a measurement of a timing difference in dual connectivity executed in a radio communication system.

(Device Configuration)

Next, an example of functional configurations of the base station apparatus 10 and the user apparatus 20 for performing the processes and operations described above is described. The base station apparatus 10 and user apparatus 20 include functions for implementing the embodiments described above. However, each of the base station apparatus 10 and the user apparatus 20 may include only a part of the functions in the embodiments.

<Base Station Apparatus 10>

Figure 20:
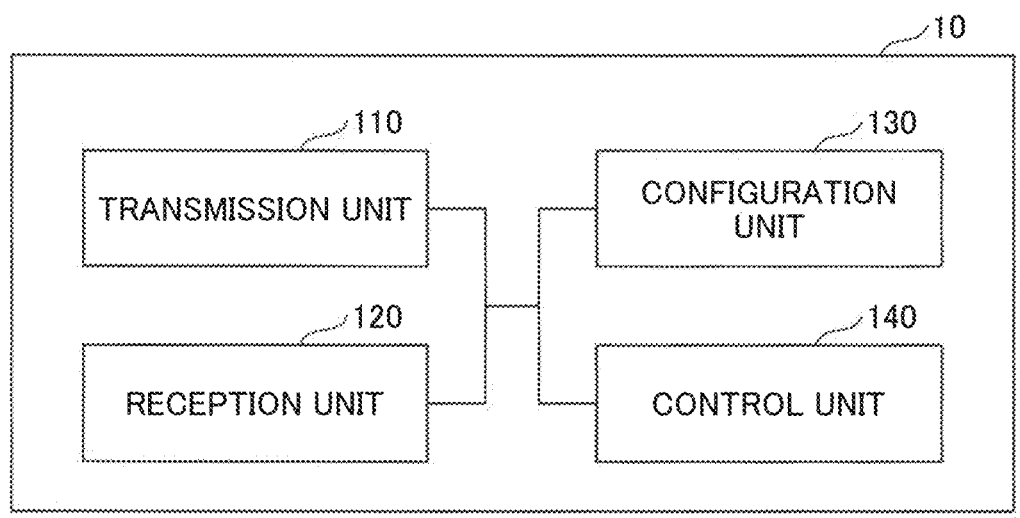
FIG. 20 is a diagram illustrating an example of a functional configuration of a base station apparatus 10 according to an embodiment of the present invention.

FIG. 20 is a diagram illustrating an example of a functional configuration of the base station apparatus 10 according to an embodiment of the present invention. As illustrated in FIG. 20, the base station apparatus 10 includes a transmission unit 110; a reception unit 120; a configuration unit 130; and a control unit 140. The functional configuration shown in FIG. 20 is only one example. If the operation according to the embodiments of the present invention can be executed, the functional division and the name of the functional units may be any division and names.

The transmission unit 110 includes a function for generating a signal to be transmitted to the user apparatus 20 and transmitting the signal through radio. The transmission unit 110 transmits an inter-network node message to another network node. The reception unit 120 includes a function for receiving various signals transmitted from the user apparatus 20 and retrieving, for example, information of a higher layer from the received signals. The transmission unit 110 has a function to transmit NR-PSS, NR-SSS, NR-PBCH, DL/UL control signals, or the like, to the user apparatus 20. The reception unit 120 receives an inter-network node message from another network nodes.

The configuration unit 130 stores preconfigured configuration information and various configuration information to be transmitted to the user apparatus 20. The content of the configuration information is, for example, information used for configuring various types of measurements by the user apparatus 20.

As described in the embodiments, the control unit 140 performs control related to generation of information used for configuring a measurement performed by the user apparatus 20, and performs control related to processing of a measurement result received from the user apparatus 20. A functional unit related to signal transmission in the control unit 140 may be included in the transmission unit 110, and a functional unit related to signal reception in the control unit 140 may be included in the reception unit 120.

<User Apparatus 20>

Figure 21:
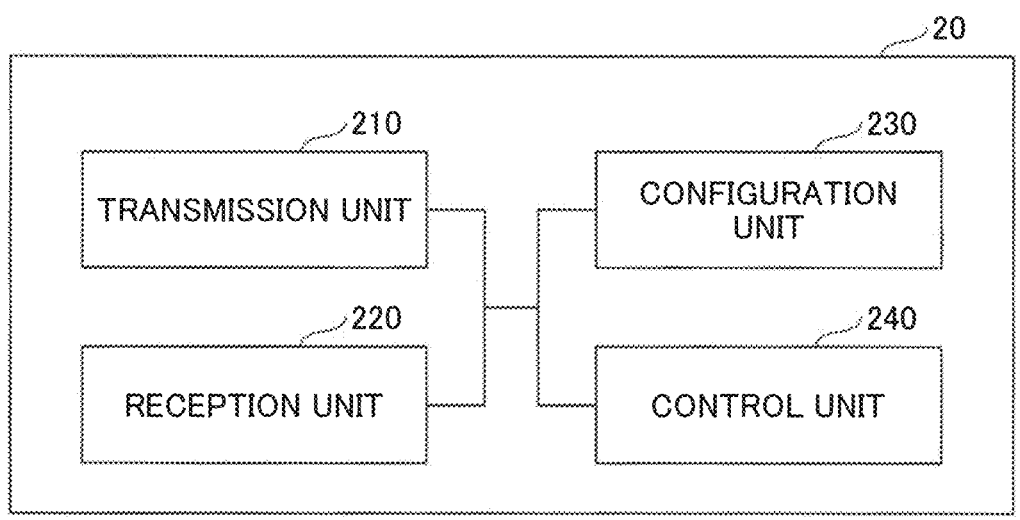
FIG. 21 is a diagram illustrating an example of a functional configuration of a user apparatus 20 according to an embodiment of the present invention.

FIG. 21 is a diagram illustrating an example of a functional configuration of a user apparatus 20 according to an embodiment of the present invention. As illustrated in FIG. 21, the user apparatus 20 includes a transmission unit 210; a reception unit 220; a configuration unit 230; and a control unit 240. The functional configuration shown in FIG. 21 is only one example. If the operation according to the embodiments of the present invention can be performed, the functional division and the name of the functional units may be any division and names.

The transmission unit 210 creates a transmission signal from transmission data and transmits the transmission signal through radio. The reception unit 220 receives various signals through radio and retrieves higher layer signals from the received physical layer signals. The reception unit 220 has a function to receive NR-PSS, NR-SSS, NR-PBCH, DL/UL/SL control signals, or the like, transmitted from the base station apparatus 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), or the like, to another user apparatus 20 as D2D communication, and the reception unit 120 receives PSCCH, PSSCH, PSDCH, PSBCH, or the like, from another user apparatus 20.

The configuration unit 230 stores various types of configuration information received from the base station apparatus 10 by the reception unit 220. The configuration unit 230 also stores preconfigured configuration information. The content of the configuration information is, for example, information related to a configuration for executing a measurement.

The control unit 240 performs control for executing a measurement and for reporting in the user apparatus 20 as described in the embodiments. A functional unit related to signal transmission in the control unit 240 may be included in the transmission unit 210, and a functional unit related to signal reception in the control unit 240 may be included in the reception unit 220.

(Hardware Configuration)

Block diagrams (FIG. 20 and FIG. 21) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire and/or radio) and using these multiple devices. The functional block may be implemented by combining software with the above-described one device or the above-described plurality of devices Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

Figure 22:
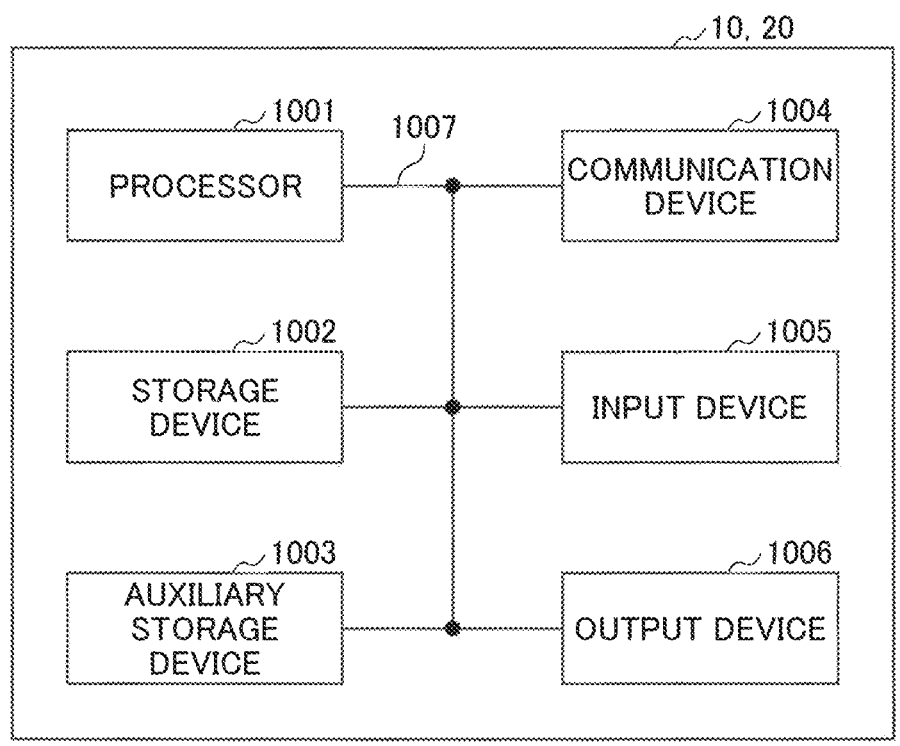
FIG. 22 is a diagram illustrating an example of a hardware configuration of the base station apparatus 10 or the user apparatus 20 according to an embodiment of the present invention.

For example, each of the base station apparatus 10 and the user apparatus 20 according to the embodiments of the present invention may function as a computer that performs processing of the radio communication method according to the present disclosure. FIG. 22 is a diagram illustrating an example of a hardware configuration of the base station apparatus 10 and the user apparatus 20 according to an embodiment of the present disclosure. The base station apparatus 10 and the user apparatus 20 may each be configured as a computer device including, physically, a processor 1001, a storage device 1002, an auxiliary storage device 1003, a communication device 1004, an input device 1005, an output device 1006, a bus 1007, and so forth.

In the following description, the term "device" can be replaced with a circuit, a device, a unit, or the like. The hardware configuration of the base station apparatus 10 and user apparatus 20 may be configured to include one or more of the devices depicted in the figure, or may be configured without some devices.

Each function of the base station apparatus 10 and the user apparatus 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and so forth. For example, the above-described control unit 140, control unit 240, or the like may be implemented by the processor 1001.

Additionally, the processor 1001 reads a program (program code), a software module, data, or the like, from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station apparatus 10 illustrated in FIG. 20 may be implemented by a control program that is stored in the storage device 1002 and that is operated by the processor 1001. Furthermore, for example, the control unit 240 of the user apparatus 20 illustrated in FIG. 21 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and so forth. The storage device 1002 may be referred to as a register, a cache, a main memory (main storage device), or the like. The storage device 1002 may store a program (program code), a software module, or the like, which can be executed for implementing the communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, and a magnetic strip. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, or a communication module. The communication device 1004 may be configured to include, for example, a high frequency switch, a duplexer, a filter, a frequency synthesizer, and the like to implement at least one of frequency division duplex (FDD: Frequency Division Duplex) and time division duplex (TDD: Time Division Duplex). For example, a transmitting/receiving antenna, an amplifier unit, a transceiver unit, a transmission line interface, and the like may be implemented by the communication device 1004. The transceiver unit may be implemented so that the transmitting unit and the receiving unit are physically or logically separated.

The input device 1005 is an input device (e.g., a keyboard, a mouse, a microphone, a switch, a button, or a sensor) that receives an external input. The output device 1006 is an output device (e.g., a display, speaker, or LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station apparatus 10 and the user apparatus 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

As described above, according to the embodiments of the present invention, there is provided a user apparatus including a communication unit configured to communicate with a first base station apparatus and a second base station apparatus, wherein the first base station apparatus is a master node in a New Radio (NR) radio communication system and the second base station apparatus is a secondary node in the NR radio communication system; a reception unit configured to receive from the first base station apparatus an instruction to measure an system frame number and frame timing difference (SFTD) representing a system frame number and frame timing difference between cells; a control unit configured to measure SFTD between a cell of the first base station apparatus and a cell of the second base station apparatus based on the instruction to measure SFTD; and a transmission unit configured to transmit to the first base station apparatus a measurement result including the measured SFTD.

According to the above-described configuration, the user apparatus 20 can perform SFTD measurement between an E-UTRA measurement applicable cell and an NR PCell and report an SFTD measurement result to a base station apparatus 10. Namely, a user apparatus can perform a timing difference measurement in dual connectivity implemented in a radio communication system.

The instruction to measure SFTD may include information indicating whether a Primary Secondary Cell (PSCell) of the second base station apparatus or one or more neighboring cells of the second base station apparatus is a cell for which SFTD is to be measured. According to this configuration, the user apparatus 20 can switch an SFTD measurement applicable cell between a PSCell and one or more neighboring cells depending on a situation.

When the information indicating a cell for which SFTD is to be measured indicates the one or more neighboring cells of the second base station apparatus, the instruction to measure SFTD may include information indicating which cell from among the one or more neighboring cells of the second base station apparatus is to be measured. According to this configuration, the user apparatus 20 can efficiently perform an SFTD measurement by indicating the one or more neighboring cells as the SFTD measurement applicable cell.

When the information indicating the cell for which SFTD is to be measured indicates the one or more neighboring cells of the second base station apparatus, and when the instruction to measure the SFTD does not include information indicating which cell from among the one or more neighboring cells of the second base station apparatus is to be measured, the control unit may be configured to determine up to three strongest cells with favorable reception environments from among the one or more neighboring cells of the second base statin apparatus as cells for which SFTD is to be measured. According to this configuration, the user apparatus 20 can efficiently perform an SFTD measurement by measuring up to three strongest cells that are the SFTD measurement applicable cells.

When the instruction to measure SFTD includes an instruction to measure Reference Signal Received Power (RSRP), Reference Signal Received Quality (RSRQ), or Signal to Interference plus Noise power Ratio (SINR), the control unit may be configured to measure RSRP, RSRQ, or SINR of a cell for which SFTD is to be measured. According to this configuration, the user apparatus 20 can report an SFTD measurement result including RSRP, RSRQ, or SINR measurement result as necessary to the base station apparatus 10.

The transmission unit may be configured to use an information element that is compatible with an SFTD measurement where the master node is a node of the NR radio communication system and the secondary node is a node of the NR radio communication system and compatible with a SFTD measurement where the master node is a node of the NR radio communication system and the secondary node is a node of an LTE radio communication system. According to this configuration, the user apparatus 20 can efficiently report an SFTD measurement result for NE-DC and a measurement result for NR-DC to the base station apparatus 10 using a common information element.

Supplemental Embodiments

While the embodiments of the present invention are described above, the disclosed invention is not limited to the embodiments, and those skilled in the art will appreciate various alterations, modifications, alternatives, substitutions, and so forth. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied to the items described in another item (as long as there is no contradiction). The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station apparatus 10 and the user apparatus 20 are described using functional block diagrams, but such devices may be implemented in hardware, software, or a combination thereof. Software operated by a processor included in the base station apparatus 10 in accordance with embodiments of the present invention and software operated by a processor included in the user apparatus 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by the base station apparatus 10 may be performed by an upper node in some cases. It is apparent that in a network consisting of one or more network nodes having the base station apparatus 10, various operations performed for communicating with the user apparatus 20 may be performed by at least one of the base station apparatus 10 and network nodes other than the base station apparatus 10 (e.g., MME or S-GW can be considered, however, the network node is not limited to these). The case is exemplified above in which there is one network node other than the base station apparatus 10. However, the network node other than the base station apparatus 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like, may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like, described in this disclosure may be represented using any of a variety of different techniques. For example, data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and so forth, may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", or "terminal", may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user apparatuses 20 (e.g., may be referred to as Device-to-Device (D2D), or Vehicle-to-Everything (V2X)). In this case, a configuration may be such that the above-described function of the base station apparatus 10 is included in the user apparatus 20. The terms "up" and "down" may also be replaced with the terms corresponding to the inter-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expecting," "considering," and so forth.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," and so forth.

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, and the like.

A slot may be formed of, in a time domain, one or more symbols (Orthogonal Frequency Division Multiplexing (OFDM) symbols, Single Carrier Frequency Division Multiple Access (SC-FDMA) symbols, or the like). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for assigning radio resources (such as a frequency bandwidth and transmission power, that can be used in each user apparatus 20) in units of TTIs to each user apparatus 20. Note that the definition of the TTI is not limited to this.

The TTI may be a transmission time unit, such as a channel coded data packet (transport block), a code block, or a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, and so forth. A TTI that is shorter than a normal TTI may be referred to as a shortened TTI, a short TTI, a partial TTI (partial TTI or fractional TTI), a shortened subframe, a short subframe, a mini-slot, a sub-slot, a slot, and so forth.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; the number of symbols, the symbol length, the cyclic prefix (CP: Cyclic Prefix) length, and the like within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Note that, in the present disclosure, the transmission unit 210 and the reception unit 220 are an example of a communication unit.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

LIST OF REFERENCE SYMBOLS 10 base station apparatus
110 transmission unit
120 reception unit
130 configuration unit
140 control unit
user apparatus
210 transmission unit
220 reception unit
230 configuration unit
240 control unit
1001 processor
1002 storage device
1003 auxiliary storage device
1004 communication device
1005 input device
1006 output device

The invention claimed is:

1. A terminal comprising:
a communication unit configured to communicate with a first base station apparatus and a second base station apparatus, wherein the first base station apparatus is a master node in a New Radio (NR) radio communication system and the second base station apparatus is a secondary node in the NR radio communication system;
a reception unit configured to receive from the first base station apparatus an instruction to measure a system frame number and frame timing difference (SFTD) representing a system frame number and frame timing difference between cells;
a control unit configured to control a transmission of the SFTD between a cell of the first base station apparatus and a cell of the second base station apparatus, the SFTD being measured based on the instruction to measure the SFTD; and
a transmission unit configured to transmit to the first base station apparatus a measurement result including the measured SFTD using a parameter configuration that is the same as a parameter configuration of an SFTD measurement result in a case in which a master node is an Evolved Universal Terrestrial Radio Access (E-UTRA) radio communication system and a secondary node is an NR radio communication system, and
wherein the instruction to measure SFTD includes information indicating that a Primary SCG Cell (PSCell) of the second base station apparatus or one or more neighboring cells of the second base station apparatus is a cell for which SFTD is to be measured.

2. The terminal as claimed in claim 1, wherein, when the information indicating a cell for which SFTD is to be measured indicates the one or more neighboring cells of the second base station apparatus, the instruction to measure the SFTD includes information indicating which cell from among the one or more neighboring cells of the second base station apparatus is to be measured.

3. The terminal as claimed in claim 1, wherein, when the instruction to measure the SFTD includes an instruction to measure Reference Signal Received Power (RSRP), the control unit is configured to measure RSRP of a cell for which SFTD is to be measured.

4. A communication method by a terminal, the method comprising:
communicating with a first base station apparatus and a second base station apparatus, wherein the first base station apparatus is a master node in a New Radio (NR) radio communication system and the second base station apparatus is a secondary node in the NR radio communication system;
receiving from the first base station apparatus an instruction to measure a system frame number and frame timing difference (SFTD) representing a system frame number and frame timing difference between cells;
controlling a transmission of the SFTD between a cell of the first base station apparatus and a cell of the second base station apparatus, the SFTD being measured based on the instruction to measure the SFTD; and
transmitting to the first base station apparatus a measurement result including the measured SFTD using a parameter configuration that is the same as a parameter configuration of an SFTD measurement result in a case in which a master node is an Evolved Universal Terrestrial Radio Access (E-UTRA) radio communication system and a secondary node is an NR radio communication system, and
wherein the instruction to measure SFTD includes information indicating that a Primary SCG Cell (PSCell) of the second base station apparatus or one or more neighboring cells of the second base station apparatus is a cell for which SFTD is to be measured.

5. A radio communication system comprising:
a terminal;
a first base station apparatus; and
a second base station apparatus,
wherein the terminal includes
- a communication unit configured to communicate with the first base station apparatus and the second base station apparatus, wherein the first base station apparatus is a master node in a New Radio (NR) radio communication system and the second base station apparatus is a secondary node in the NR radio communication system;
- a reception unit configured to receive from the first base station apparatus an instruction to measure a system frame number and frame timing difference (SFTD) representing a system frame number and frame timing difference between cells;
- a control unit configured to control a transmission of the SFTD between a cell of the first base station apparatus and a cell of the second base station apparatus, the SFTD being measured based on the instruction to measure the SFTD; and
- a transmission unit configured to transmit to the first base station apparatus a measurement result including the measured SFTD using a parameter configuration that is the same as a parameter configuration of an SFTD measurement result in a case in which a master node is an Evolved Universal Terrestrial Radio Access (E-UTRA) radio communication system and a secondary node is an NR radio communication system, and
wherein the instruction to measure SFTD includes information indicating that a Primary SCG Cell (PSCell) of the second base station apparatus or one or more neighboring cells of the second base station apparatus is a cell for which SFTD is to be measured.

* * * * *